United States Patent [19]
Kinney

[11] Patent Number: 5,629,048
[45] Date of Patent: May 13, 1997

[54] RAPID SETTING CEMENTITIOUS COMPOSITIONS AND METHOD

[75] Inventor: Frederick D. Kinney, Broadview Heights, Ohio

[73] Assignee: Sandoz Ltd., Basel, Switzerland

[21] Appl. No.: 650,085

[22] Filed: May 17, 1996

Related U.S. Application Data

[60] Continuation of Ser. No. 471,589, Jun. 6, 1995, abandoned, which is a division of Ser. No. 309,371, Sep. 20, 1994, abandoned.

[51] Int. Cl.$^6$ .................................................. C04B 24/04
[52] U.S. Cl. .......................... 427/403; 427/421; 427/427; 106/696; 106/724; 106/728; 106/802; 106/819; 106/823
[58] Field of Search .................................. 427/403, 421, 427/427; 106/696, 724, 728, 802, 819, 823

[56] References Cited

U.S. PATENT DOCUMENTS

| | | | |
|---|---|---|---|
| 3,600,203 | 8/1971 | Aldera | 106/38.3 |
| 3,617,319 | 11/1971 | Sadran | 106/696 |
| 3,656,985 | 4/1972 | Bonnel et al. | 106/90 |
| 3,826,665 | 7/1974 | Hovasse et al. | 106/104 |
| 3,856,541 | 12/1974 | Martin | 106/90 |
| 3,926,650 | 12/1975 | Lange et al. | 106/90 |
| 3,973,978 | 8/1976 | Nakagawa et al. | 106/696 |
| 4,075,374 | 2/1978 | Jorgenson et al. | 427/355 |
| 4,082,561 | 4/1978 | Nakagawa et al. | 106/695 |
| 4,084,981 | 4/1978 | Higuchi et al. | 106/671 |
| 4,088,804 | 5/1978 | Cornwell et al. | 264/256 |
| 4,159,912 | 7/1979 | Jorgenson | 106/109 |
| 4,190,454 | 2/1980 | Yamagisi et al. | 106/790 |
| 4,264,367 | 4/1981 | Schutz | 106/90 |
| 4,328,039 | 5/1982 | Masuda | 106/715 |
| 4,357,167 | 11/1982 | Kellet et al. | 106/694 |
| 4,670,055 | 6/1987 | Koslowski | 106/695 |
| 4,804,563 | 2/1989 | Hillemeier | 427/427 |
| 5,149,368 | 9/1992 | Liu et al. | 501/1 |
| 5,223,036 | 6/1993 | Koyata et al. | 106/724 |
| 5,269,845 | 12/1993 | Grunau et al. | 427/427 |
| 5,273,579 | 12/1993 | Tanaka et al. | 106/785 |
| 5,340,612 | 8/1994 | Perito | 427/427 |
| 5,350,450 | 9/1994 | Hamabe et al. | 427/427 |
| 5,356,671 | 10/1994 | Drs | 427/427 |
| 5,374,308 | 12/1994 | Kirkpatrick | 106/819 |
| 5,378,277 | 1/1995 | Caron | 106/606 |
| 5,387,283 | 2/1995 | Kirkpatrick et al. | 106/709 |

FOREIGN PATENT DOCUMENTS

| | | | |
|---|---|---|---|
| 1377203 | 9/1964 | France | 106/696 |
| 2684096 | 5/1993 | France . | |
| 2828988 | 1/1979 | Germany . | |
| 9069761 | 7/1974 | Japan | 106/728 |
| 0017426 | 2/1975 | Japan | 106/728 |
| 0088033 | 8/1978 | Japan | 166/696 |
| 54-001733 | 8/1979 | Japan . | |
| 0150433 | 11/1979 | Japan | 106/696 |
| 0104952 | 8/1980 | Japan | 106/696 |
| 0167460 | 10/1983 | Japan | 106/728 |
| 0108352 | 6/1985 | Japan | 106/696 |
| 0151289 | 8/1985 | Japan | 106/696 |
| 0155239 | 7/1986 | Japan | 106/728 |
| 01257156 | 10/1989 | Japan . | |
| 1522501 | 8/1978 | United Kingdom . | |
| 1522502 | 8/1978 | United Kingdom . | |
| 2033367 | 5/1980 | United Kingdom . | |
| 1575450 | 9/1980 | United Kingdom . | |
| 2240334 | 7/1991 | United Kingdom . | |

OTHER PUBLICATIONS

Japanese Patent Abstract, "Soil Stabilizer Composition", Nishimura et al., JP 60–55076 (Mar. 29, 1985).
Japanese Patent Abstract—"Grout", Itou et al., JP 59–120681 (Jul. 12, 1984).
Japanese Patent Abstract, "Soil Stabilizer Composition", Nishimura et al., JP 59–84974 (May 16, 1984).
Japanese Patent Abstract, "Soil Stabilizer Composition", Nishimura et al., JP 59–84973 (May 16, 1984).
Japanese Patent Abstract, "Soil Stabilizer", Suganuma et al., JP 59–62689 (Apr. 10, 1984).
Japanese Patent Abstract, "Hot Shotcrete and Hot Shotcrete Technique", Kawauchi et al., JP 02–97449 (Apr. 10, 1990).
JPO & JAPIO Abstract No.: 03107744 & JP02083244 A (Showa Denka) 23 Mar. 1990 Teruyuki et al. "Dry Spraying Method".
Chemical Abstract 112:239697, Tsuchida, Mikio, Storable, *High Concentration Aqueous Calcium Nitrite Solutions*, JP 01257112 (Oct. 1989).

*Primary Examiner*—Paul Marcantoni
*Attorney, Agent, or Firm*—Robert S. Honor; Carl W. Battle; Carol A. Loeschorn

[57] ABSTRACT

A method of rapidly forming in place a cementitious structure comprising mixing a cement composition with an amount of a water soluble citrate effective to accelerate the setting of the cement in the presence of sufficient water for hydraulic setting of the cement, and delivering the resulting composition while fluid to the place for forming the cementitious structure.

9 Claims, No Drawings

RAPID SETTING CEMENTITIOUS COMPOSITIONS AND METHOD

This is a continuation of application Ser. No. 08/471,589, filed Jun. 6, 1995, now abandoned, which in turn is a divisional of application Ser. No. 08/309,371, filed Sep. 20, 1994, now abandoned.

The present invention relates to rapid setting cement compositions and more particularly to the use of certain chemicals as quick-setting agents in formulating such compositions.

Rapid setting cement compositions are desirable and widely used materials, particularly in applications known as lining and relining construction where a continuous layer of modest thickness of a cement composition is applied to a surface. A common procedure in which rapid setting cement compositions are used is well-known as shotcreting. Other applications for rapid-setting cement compositions include cement plugging compounds and quick-setting mortars. In all such usages, the cement composition must set quickly in order to retain its position as applied.

The particular quick-setting agent used in rapid-setting cement compositions will influence a number of performance criteria of interest to the industry. Not only must the agent effect a rapid setting within certain time limits, but the rapid setting is desirably achieved with economically attractive amounts of a quick-setting agent. In addition, the rapid development of strength properties, which does not arise simply because of the rapid setting, is an important performance criteria of a quick-setting agent. The ability to continue early strength development to a high final strength is also a desirable objective.

Quick-setting agents have been traditionally strongly alkaline solutions of silicates and aluminates. The aluminates tend to be better than the silicates in providing early strength development, but the aluminates are also caustic. The caustic nature of both the silicates and aluminates has raised both health and environmental concerns.

It is an objective in the cement art to provide alternatives to current quick-setting agents and particularly to provide quick-setting agents which provide rapid early strength development and it would be desirable to have non-caustic agents with such strength development and other desired properties.

In accordance with the invention, it has been found that water soluble salts of citric acid, in particular alkali metal salts, are especially useful as quick-setting agents in cementitious compositions.

The invention therefore provides in one major aspect thereof rapid-setting cementitious compositions comprising hydraulic cement and at least 4% by weight of the cement of a water soluble salt of citric acid or mixture thereof. These compositions will be applied in admixture with sufficient water for hydraulic setting of the cement. Both very quick setting and rapid and good strength development is obtained with the invention.

In another embodiment the compositions of the present invention consist essentially of hydraulic cement and at least 4% by weight of the cement of a water soluble salt of citric acid or mixture thereof.

A salt of citric acid for purposes of this invention is defined as a citric acid molecule with all three of its acid groups in salt form, i.e. to provide the tri-salt forms. The preferred water-soluble salt forms are the alkali metal salt forms, particularly the sodium, potassium and lithium salt forms. The particularly preferred quick-setting agents are sodium citrate and potassium citrate, and mixtures thereof, with potassium citrate being most preferred. However, lithium salts may be preferred where the alkali-silica reaction is a concern since it is well known that lithium salts inhibit the alkali-silica reaction. The citric acid salts used in the invention are generally used in their pre-prepared salt forms which are commercially available. The citric acid salts are preferably added to the cementitious compositions as aqueous solutions, generally at concentrations of about 50% by weight of neutralized acid, although the concentration is not critical. For the less soluble salts, e.g. lithium salts, the concentrations would be less than 50% by weight.

In general, at least 4% by weight of water soluble citrate based on the weight of the hydraulic cement is required to attain the quick-setting action possessed by these agents. When a citrate is employed in amounts of 4% or more, it will rapidly accelerate the setting of the cement. Substantially greater amounts up to 20% by weight or more may be employed depending upon the final formulation, objectives and conditions of use. Desirably, at least 5% water soluble citrate based on the weight of the cement is employed with amounts greater than 10% being unnecessary in most applications. Preferably, the amount of citrate is in the range of 5.0 to 8.5%, more usually 5.5 to 8.0%, based on the weight of the hydraulic cement.

In general, the water soluble citrates depending largely on the amount employed can be used to provide quick-setting as desired in a variety of applications. Hence, an initial setting time of not greater than 20 minutes by ASTM Method C266 can be readily achieved. Setting times in the range of 10 seconds to 5 minutes, preferably 30 seconds to 5 minutes, as common in shotcreting applications, are easily targeted by the addition of water soluble citrates in accord with the invention.

The hydraulic cement employed in the compositions of the invention is a commercially produced calcium aluminosilicate mineral blend, which when mixed with water will set to form a hard product. The most common type of hydraulic cement is portland cement, i.e. types I–IV portland cement, and for purposes of the present invention, portland cement is the preferred hydraulic cement.

In addition to cement, the compositions of the invention may include other ingredients commonly present in quick-setting cement compositions and other cement additives which do not substantially interfere with the quick-setting ability of the compositions of the invention.

A common ingredient of quick-setting cement composition is aggregate, especially fine aggregate such as sand and the like. Pea gravel aggregates (maximum diameter of 0.375 inch) and the like may also be used in shotcrete applications with suitable nozzles. Coarse aggregates may also be used in quick-setting applications. In typical applications the amount of aggregate, e.g. fine aggregate such as silica sand, will be present in a weight ratio to the cement of from 0.5:1 to 6:1, more usually from 1.2:1 to 5:1, and particularly from 1.5:1 to 4.5:1. Lighter weight aggregates such as perlite and the like may also be used.

A variety of other materials not classed as aggregates may also be included. Examples are silica fume, silicones and fibers such as glass and steel fibers. Agents to provide cohesion or bonding of the applied cement composition, such as polyvinyl alcohols, may also be included.

The amount of water to be included in the quick-setting compositions of the invention will vary depending upon the particular application and other known factors, but is always sufficient for the hydraulic setting of the cement component. The amount of water used in shotcrete application is usually controlled to avoid undesired fluidity. Hence, the amount of water in shotcrete compositions will usually vary from 20% to 60%, more usually 30% to 45%, by weight of the hydraulic cement component. Since the water soluble citrates have been found to have a solids dispersing effect, the amount of water may be less than that otherwise indicated for particular applications. In other applications, greater amounts of water than used in shotcreting may be employed to provide desired fluidity. Other cement additives to maintain fluidity may also be used but in general the compositions will achieve a rapid initial set in not greater than 20 minutes, preferably no more than 15 minutes under the influence of the water soluble citrate when employed in amounts of 4% by weight of the cement or greater.

The rapid-setting compositions and method of the invention is particularly useful in shotcrete applications.

Shotcreting can be carried out using a dry mix cement composition (the dry mix system) or a wet mix cement composition (the wet mix system), as described below.

a) The dry mix system is one in which dry mixed cement and aggregate are pneumatically conveyed through a delivery hose, with water and a quick-set agent being added in the vicinity of the nozzle assembly or upstream of the nozzle just prior to passage into the nozzle assembly. The mixture is applied onto the requisite surface in the vicinity of the nozzle, by pneumatically projecting it out from the nozzle under pressure, e.g. by means of compressed air. With the dry mix system it is difficult to control the quantity of water added and therefore to control the water to cement ratio (hereinafter referred to as the W/C ratio). Further, dust is generated and this is a drawback. Alternatively the quick-setting agent can be added at the point of mixing instead of vicinal to the nozzle.

b) The wet mix system is a system in which the cement and aggregate are mixed in the presence of water and the mixture pumped through a delivery hose to a nozzle and then pneumatically projected out of the nozzle; a quick setting agent being added within the nozzle assembly or upstream of the nozzle, just prior to passage into the nozzle. There are also examples of this system where the cement composition can be pumped, rather than pneumatically conveyed, to a point midway between the point of mixing and the nozzle in the delivery hose followed by pneumatic conveying between this midpoint and nozzle. The system allows good control of W/C ratio and generates little dust.

Pressures employed in the pneumatic delivery of cement compositions in shotcreting generally range from 60 to 140 psi, and are more usually 80 to 120 psi.

The following examples merely demonstrate the invention and are not intended to limit the same. In the examples set times are determined from the time the citrate solution comes into contact with the cement/sand mixture.

EXAMPLE 1

The mix procedure simulates the time scale of wet-mix shotcreting, such that the mortar is premixed and the shotcrete accelerator, added at the nozzle, is mixed with the mortar only for a brief moment.

In a plastic bag, 3000 g of mortar mix (dry ingredients), which consists of 590 g of ordinary portland cement, 30 g of silica fume, and 2380 g of silica sand, is blended. To this mix, 206.5 g. of water will be added. Approximately 75% of the mixing water is placed in the mixing bowl of a Hobart lab mixer. The blended dry ingredients are then added. The mixer is started on low speed and the mortar is mixed for two minutes. During this time, the 35.4 g of potassium citrate (6% by weight of cement) is dissolved in the remaining mix water. This is added into the mixing bowl at the conclusion of the two minute initial mix cycle, and the mortar is mixed for an additional minute. The test specimens are then cast immediately. Setting time and compressive strength measurements conform to American Society for Testing and Materials Methods C 266 and C 109, respectively, with the following results.
Setting Time @16° C.+/−0.5° C.(61° F.+/−1° F.)
Final: 7 minutes

| Compressive Strength @ 16° C. (61° F.) | |
| --- | --- |
| | MPa (PSI) |
| 1 hour | 5 (730) |
| 4 hour | 12 (1709) |
| 1 day | 17 (2404) |
| 7 day | 25 (3647) |
| 28 day | 38 (5433) |

EXAMPLE 2

Example 1 is repeated except that the experiment was conducted at a temperature of 51.3° F. and the amount of potassium citrate was increased to 8% by weight of the cement. Setting time and strength properties by ASTM C266 and C109, respectively, were as follows.
Setting Time @0.5° C. +/−0.5° C.(51° F.+/−1° F.)
Final: 5 minutes

| Compressive Strength @ 16° C. (61° F.) | |
| --- | --- |
| | MPa (PSI) |
| 1 hour | 5 (707) |
| 4 hour | 7 (1060) |
| 1 day | 19 (2742) |
| 7 day | 30 (4256) |
| 28 day | 41 (5856) |

EXAMPLE 3

In cement paste experiments (100 g. portland cement and 35 g. of deionized water), 5% of potassium citrate and 5% of lithium citrate (based on the weight of the cement) were individually evaluated with following set times recorded by a Vicat needle apparatus.

| Citrate | Initial Set | Final Set |
| --- | --- | --- |
| potassium citrate | 240 seconds | 320 seconds |
| lithium citrate | 200 seconds | 280 seconds |

EXAMPLE 4

Following the general procedure of Example 1, a shotcrete mortar mix was prepared to contain 122 g. of Ashgrove Type I portland cement, 220 g. of silica sand, 40 g. of water and 7 g. of potassium citrate. The sand and cement were mixed together and then mix with a solution of the citrate in the water. The resulting composition had an initial set of 30 seconds (ASTM C266) and a 1 hour compressive strength of 1800 psi (ASTM C109).

What is claimed is:

1. The method of rapidly forming in place a cementitious structure comprising mixing a cement composition with an amount of a water-soluble citrate effective to accelerate the set of the cement in the presence of sufficient water for hydraulic setting of the cement, and delivering the resulting composition while fluid to the place for forming the cementitious structure, said amount of water-soluble citrate being at least 4% by weight based on the weight of cement.

2. A method of claim 1 in which the cement composition is pneumatically delivered through a nozzle to the place of cementitious structure.

3. A method of claim 2 in which the citrate in the form of an aqueous citrate solution is mixed with the cement composition just prior to discharge from the nozzle.

4. A method of claim 1 in which the amount of citrate is 5% to 8.5% by weight based on the weight of the cement.

5. A method of accelerating the set of a cement mix comprising the steps of adding an accelerating amount of a water-soluble citrate to a cement mix, and allowing the cement mix to set, said amount of water-soluble citrate being at least 4% by weight based on the weight of the cement.

6. A method according to claim 5 wherein the accelerating amount of the water-soluble citrate is present in an amount of from 5% to 8.5% by weight based on the weight of the cement.

7. A method according to claim 5 wherein the water-soluble citrate is an alkali metal citrate.

8. A method according to claim 7 wherein the alkali metal citrate is tripotassium citrate.

9. A method according to claim 5 wherein the cement mix includes aggregate.

* * * * *